US005726256A

United States Patent [19]
Benson et al.

[11] Patent Number: 5,726,256
[45] Date of Patent: Mar. 10, 1998

[54] METHOD OF MAKING SILICONE PRESSURE SENSITIVE ADHESIVES

[75] Inventors: Edward Joseph Benson; Joseph Thomas Braun, both of Midland; Joseph Norbert Clark, Freeland; Peter Lamont, Midland, all of Mich.

[73] Assignee: Dow Corning Corporation, Midland, Mich.

[21] Appl. No.: 734,944

[22] Filed: Oct. 22, 1996

[51] Int. Cl.⁶ ............................................. C08F 283/00
[52] U.S. Cl. .................... 525/477; 528/12; 528/14; 528/19
[58] Field of Search ............................ 525/477; 528/12, 528/14, 19

[56] References Cited

U.S. PATENT DOCUMENTS

| | | | |
|---|---|---|---|
| 2,676,182 | 9/1954 | Daudt et al. | 260/448.2 |
| 3,627,851 | 12/1971 | Brady | 260/825 |
| 3,772,247 | 11/1973 | Flannigan | 260/46.5 |
| 4,584,355 | 4/1986 | Blizzard et al. | 525/477 |
| 4,585,836 | 4/1986 | Homan et al. | 525/477 |
| 4,591,622 | 5/1986 | Blizzard et al. | 525/477 |
| 4,882,377 | 11/1989 | Sweet et al. | 525/477 |
| 5,441,811 | 8/1995 | Lin et al. | 524/588 |

*Primary Examiner*—Melvyn I. Marquis
*Attorney, Agent, or Firm*—Sharon K. Severance

[57] ABSTRACT

The instant invention pertains to a method of producing silicone pressure sensitive adhesives wherein the method comprises (I) combining together (A) a benzene soluble, hydroxyl containing organopolysiloxane resin consisting essentially of $R_3SiO_{1/2}$ siloxane units and $SiO_{4/2}$ siloxane units, wherein R is a monovalent radical selected from the group consisting of hydrocarbon and halogenated hydrocarbon radicals having from 1 to 10 carbon atoms; there being from 0.5 to 1.5 $R_3SiO_{1/2}$ units for every $SiO_{4/2}$ units and there being 1.0 to 4 wt %, based on FTIR, hydroxyl functionality and (B) a hydroxyl containing polydiorganosiloxane having a viscosity of $\geq 100$ mPa's and (C) a catalyst selected from the group consisting of a weak organic acid or metal salt thereof; and thereafter (II) heating the mixture of (A), (B) and (C) for a time sufficient to produce the silicone pressure sensitive adhesive.

11 Claims, No Drawings

METHOD OF MAKING SILICONE PRESSURE SENSITIVE ADHESIVES

BACKGROUND OF THE INVENTION

Silicone pressure sensitive adhesives (SPSAs) are typically comprised of two main components. The first component is a silicone tackifier resin consisting essentially of triorganosiloxane (M) units (i.e., $R_3SiO_{1/2}$ units, in which R denotes a monovalent organic group) and silicate (Q) units (i.e., $SiO_{4/2}$ units), commonly referred to as a MQ resin. The second component is a polydiorganosiloxane. This polydiorganosiloxane can be linear, branched, low viscosity or high viscosity.

Depending on the properties desired in the silicone pressure sensitive adhesive other additives may be present in the composition or the resin and/or polydiorganosiloxane may be modified to suit the desired outcome in adhesive properties such as tack, cohesive strength, adhesion and others. However, in most silicone pressure sensitive adhesives the resin is a hydroxy functional MQ resin and the polydiorganosiloxane is a hydroxyl containing polydimethylsiloxane. The resin and polydiorganosiloxane can be blended together to produce the silicone pressure sensitive adhesive. However, this blend will, in most instances, lack the optimal cohesive properties of a pressure sensitive adhesive. U.S. Pat. Nos. 2,736,721; 2,814,601; 2,857,356; and 3,528,940 all disclose silicone pressure sensitive adhesive compositions that are blends of and silicone resin and polydiorganosiloxane.

Lower viscosity polydiorganosiloxanes are typically used in the production of high solids pressure sensitive adhesives. However, peroxide curing of these high solids pressure sensitive adhesives cannot be used since the resulting pressure sensitive adhesive does not have sufficient cohesive strength due to the light degree of crosslinking introduced by the peroxide catalyst.

It is known in the art that the cohesive properties of the silicone pressure sensitive adhesive can be improved by condensing the resin and polydiorganosiloxane together. The hydroxyl functionality found on the resin and polydiorganosiloxane are the typical reactive site for this condensation reaction. The condensation reaction takes place by heating the mixture of resin and polydiorganosiloxane for a sufficient time to produce the desired silicone pressure sensitive adhesive. In some instances a basic catalyst, such as ammonia, has been employed to promote the condensation. However, when using heat and/or a highly reactive basic catalyst it is difficult to produce a silicone pressure sensitive adhesive having consistent properties. Although the reaction may be run for the same period of time, under the same conditions, the resulting silicone pressure sensitive adhesives will be different.

It has now been found that when an weak organic acid is employed during the condensation reaction, the properties of the silicone pressure sensitive adhesive can be controlled to result in a consistent pressure sensitive adhesive composition with improved elastomeric properties. It has also been found that the resulting pressure sensitive adhesives can be cured using a peroxide giving the ability to produce high solids pressure sensitive adhesives that have high tack values and cohesive strength.

Therefore, it is an object of the instant invention to provide a method for producing silicone pressure sensitive adhesives wherein said method comprises condensing the silicone resin and polydiorganosiloxane using a weak organic acid catalyst.

It is further an object of the instant invention to provide a method for producing silicone pressure sensitive adhesive wherein the method comprises condensing the silicone resin and polydiorganosiloxane using a weak organic acid catalyst and thereafter curing the silicone pressure sensitive adhesive with a crosslinking agent.

SUMMARY OF THE INVENTION

The instant invention pertains to a method of producing silicone pressure sensitive adhesives wherein the method comprises (I) combining together (A) a benzene soluble, hydroxyl containing organopolysiloxane resin consisting essentially of $R_3SiO_{1/2}$ siloxane units and $SiO_{4/2}$ siloxane units, wherein R is a monovalent radical selected from the group consisting of hydrocarbon and halogenated hydrocarbon radicals having from 1 to 10 carbon atoms; there being from 0.5 to 1.5 $R_3SiO_{1/2}$ units for every $SiO_{4/2}$ units and there being 1.0 to 4 wt %, based on FTIR, hydroxyl functionality and (B) a hydroxyl containing polydiorganosiloxane having a viscosity of $\geq 100$ mPa's and thereafter (II) heating the mixture of (A) and (B) in the presence of a catalyst selected from the group consisting of a weak organic acid or metal salt thereof. The reaction is carried out until the desired properties of the silicone pressure sensitive adhesive have been achieved. This consistently produces silicone pressure sensitive adhesives having improved adhesive properties.

THE INVENTION

The instant invention pertains to a method for the production of a silicone pressure sensitive adhesive having reproducible properties. The method for producing silicone pressure sensitive adhesives comprises (I) combining (A) a benzene soluble, hydroxyl containing organopolysiloxane resin consisting essentially of $R_3SiO_{1/2}$ siloxane units and $SiO_{4/2}$ siloxane units, wherein R is a monovalent hydrocarbon radical having 1 to 10 carbon atoms; there being from 0.5 to 1.5 $R_3SiO_{1/2}$ units for every $SiO_{4/2}$ units and there being 1 to 4 wt % hydroxyl functionality based on FTIR and (B) a hydroxyl containing polydiorganosiloxane having a viscosity of $\geq 100$ mPa's and thereafter (II) heating the mixture of (A) and (B) in the presence of a weak organic acid until the desired properties of the silicone pressure sensitive adhesive have been achieved.

Component (A) of the instant invention is benzene soluble, hydroxyl containing organopolysiloxane resin. Organopolysiloxane resin (A) includes a resinous portion wherein the $R_3SiO_{1/2}$ siloxane units (M units) are bonded to the $SiO_{4/2}$ siloxane units (Q units), each of which is bonded to at least one other $SiO_{4/2}$ siloxane unit; wherein R is selected from the group consisting of hydrocarbon radicals and halogenated hydrocarbon radicals. Some $SiO_{4/2}$ siloxane units may be bonded to hydroxyl radicals resulting in $HOSiO_{3/2}$ units (i.e., TOH units), thereby accounting for any silicon-bonded hydroxyl content of the organopolysiloxane resin. In addition to the resinous portion, organopolysiloxane resin (A) can contain a small amount of a low molecular weight material comprised substantially of a neopentamer organopolysiloxane having the formula $(R_3SiO)_4Si$, the latter material being a byproduct in the preparation of the resin.

The organopolysiloxane resin (A) contains hydroxyl functionality. The organopolysiloxane resin should contain from 1 to 4 wt % hydroxyl functionality, preferably from 1.8 to 3.6 wt % hydroxyl functionality, based on resin solids, as determined by FTIR.

For the purposes of the present invention, the ratio of $R_3SiO_{1/2}$ siloxane units to $SiO_{4/2}$ siloxane units has a molar ratio of 0.5 to 1.5, respectively. It is preferred that the mole ratio of the total M siloxane units to total Q siloxane units of organopolysiloxane resin (A) be between 0.6 and 1.1. The above M/Q mole ratios can be easily obtained by $^{29}$Si nuclear magnetic resonance, this technique being capable of a quantitative determination of the molar contents of: M (resin), M(neopentamer), Q (resin), Q(neopentamer) and TOH. For the purposes of the present invention, as implicitly stated supra, the M/Q ratio {M(resin)+M(neopentamer)}/{Q(resin)+Q(neopentamer)} represents the ratio of the total number of triorganosiloxy groups of the resinous and neopentamer portions of (A) to the total number of silicate groups of the resinous and neopentamer portions of (A). It will, of course, be understood that the above definition of the M/Q mole ratio accounts for the neopentomer resulting from the preparation of resin (A) and not for any intentional addition of neopentomer.

In the formula for organopolysiloxane resin (A), R denotes a monovalent radical selected from the group consisting of hydrocarbon and halogenated hydrocarbon radicals having from 1 to 10 carbon atoms, and most preferably having from 1 to 6 carbon atoms. Examples of suitable R radicals include alkyl radicals, such as methyl, ethyl, propyl, pentyl, and octyl; cycloaliphatic radicals, such as cyclohexyl; aryl radicals such as phenyl, tolyl, xylyl, benzyl, alpha-methyl styryl and 2-phenylethyl; alkenyl radicals such as vinyl; and chlorinated hydrocarbon radicals such as 3-chloropropyl and dichlorophenyl.

Preferably, at least one-third, and more preferably substantially all R are methyl radicals. Examples of preferred $R_3SiO_{1/2}$ siloxane units include $Me_3SiO_{1/2}$, $ViMe_2SiO_{1/2}$, $PhMe_2SiO_{1/2}$ and $Ph_2MeSiO_{1/2}$ where Me hereinafter denotes methyl and Ph hereinafter denotes phenyl.

It is preferred that the resinous portion of component (A) have a number average molecular weight (Mn) of about 1,500 to 15,000 when measured by gel permeation chromatography (GPC), the neopentamer peak being excluded from the measurement. In this molecular weight determination, narrow fractions of MQ resins are used to calibrate the GPC equipment, the absolute molecular weights of the fractions being first ascertained by a technique such as vapor phase osmometry. This molecular weight is preferably above about 3,000, most preferably 3,500 to 6,500.

By the term benzene soluble it is meant that the organopolysiloxane resin can be dissolved substantially completely, in either a hydrocarbon liquid such as benzene, toluene, xylene, heptane and the like or in a silicone liquid such as cyclic or linear polydiorganosiloxanes. Preferably the resin is soluble in the hydroxyl-containing polydiorganosiloxane (B).

Organopolysiloxane resin (A) can be prepared by well known methods. It is preferably prepared by the silica hydrosol capping process of U.S. Pat. No. 2,676,182 to Daudt et al.; as modified by U.S. Pat. Nos. 3,627,851 to Brady; and 3,772,247 to Flannigan; each patent being incorporated herein by reference to teach how to prepare soluble organopolysiloxanes which are useful in the instant invention. The resulting resin can be used in the instant invention without further modification or it can be capped with trialkylsilyl groups to reduce the silanol content. This can be accomplished by well known methods, such as reacting the resin with a compound such as trimethylchlorosilane or hexamethyldisilazane.

Methods for reducing the silanol content in organopolysiloxane resins are well known in the art. The silanol content in the organopolysiloxane resin may be reduced by first preparing an untreated resin and thereafter treating an organic solvent solution of the resin with a suitable endblocking agent to reduce the amount of silicon-bonded hydroxyl. Endblocking agents capable of providing endblocking triorganosilyl units are commonly employed as silylating agents and a wide variety of agents are known and disclosed in U.S. Pat. Nos. 4,584,355 and 4,591,622 to Blizzard, et al., and 4,585,836 to Homan, et al. which are hereby incorporated by reference. A single endblocking agent such as hexamethyldisilazane can be used or a mixture of such agents can be used. The procedure for treating the resin may be simply to mix the endblocking agent with a solvent solution of the resin and allowing the by-products to be removed, preferably, an acid catalyst is added and the mixture is heated to reflux conditions for a few hours.

Component (B) of the instant invention is a hydroxyl-containing polydiorganosiloxane polymer, preferably a hydroxyl-terminated polydiorganosiloxane polymer. The repeat units of (B) are $R_2SiO_{2/2}$ siloxane units wherein R is the same as described for organopolysiloxane resin (A) above. Polydiorganosiloxane (B) can be comprised of a single polymer or copolymer or it can be a mixture of two or more such polymers or copolymers. For the purposes of the present invention, each polydiorganosiloxane should have a viscosity at 25° C. of about $\geq 100$ centipoise (mPa's). The polydiorganosiloxane can have a viscosity of >1,000,000 mPa's. Polydiorganosiloxanes having a viscosity of >1,000,000 mPa's are typically gums and their viscosity may be represented in terms of plasticity where plasticity is a measure of the resistance of flow of the polymer when placed under a constant load for a period of time. Polydiorganosiloxanes having viscosity of >1,000,000 mPa's useful in the instant invention have a plasticity of 50 to 65 mils, preferably 54–60 mils.

When producing high solids pressure sensitive adhesives it is preferable to use polydiorganosiloxanes that have a viscosity of between 100 and 1,000,000 mPa's, more preferably between 1,000 and 500,000 mPa's. By high solids it is meant a pressure sensitive adhesive composition comprising $\geq 60$ wt % non-volatile components, preferably $\geq 75$ wt %, in a solvent. Preferably the high solids silicone pressure sensitive adhesive has a viscosity of $\leq 300,000$, preferably $\leq 100,000$, wherein said viscosity is the viscosity of the solvent based composition (psa and solvent). Polydiorganosiloxanes having a viscosity of greater than 1,000,000 may be used in the production of typical solvent based pressure sensitive adhesives.

It is preferred that at least 50%, and preferably at least 85%, of the organic radicals (R groups) along the chain of polydiorganosiloxane (B) are methyl radicals, which can be distributed in any manner in the organopolysiloxane. Further, polydiorganosiloxane (B) can comprise up to about 10 mole percent of siloxane branching sites provided it meets the above viscosity requirements. The preferred polydiorganosiloxane useful in the instant invention is a hydroxyl endblocked polydimethylsiloxane.

The organopolysiloxane resin (A) is employed in amount from about 40 to 70 parts by weight in the silicone pressure sensitive adhesive, and the polydiorganosiloxane (B) is employed from about 30 to about 60 parts by weight, wherein the total parts of the organopolysiloxane resin (A) and the polydiorganosiloxane (B) are 100 parts. It is preferred that the organopolysiloxane resin (A) be employed from about 50 to 60 parts by weight, and correspondingly, the polydiorganosiloxane (B) be employed from about 40 to 50 parts by weight, wherein the total parts by weight equals 100.

To promote the condensation reaction, the organopolysiloxane resin and polydiorganosiloxane fluid are combined and heated in the presence of a catalyst selected from the group consisting of weak organic acid or metal salt thereof. Weak organic acids useful in the instant invention include carboxylic acids such as acetic acid, propanoic acid, butanoic acid, formic acid and metal salts of carboxylic acids wherein the metal is selected from the group consisting of Li, Na, K, Ce, and Ca. The metal salts of carboxylic acids may be exemplified by, but not limited to potassium formate, potassium acetate, and others. Acetic acid is the preferred acid catalyst.

The amount of catalyst added to the reaction mixture will typically be from 5 to 10,000 ppm based on the combined weight of (A) and (B), preferably from 5 to 500 ppm. This amount may vary if there is a neutralizing contaminate, such as potassium, found in either the organopolysiloxane resin or the polydiorganosiloxane. If such a contaminant is present, then additional acid may be added to account for the acid which is neutralized by the contaminant.

(A), (B) and (C) may be combined in any order. It is preferable to load (B) into the reaction vessel and thereafter add any (C) needed to compensate for a neutralizing contaminate. Following this (A) is added followed by the catalytic amount of (C).

Typically the reaction is carried out at a temperature of 50° C. to 200° C. at atmospheric pressure, preferably at a temperature of 100° C. to 150° C. Temperatures can be adjusted accordingly if the reaction is run at sub-atmospheric or super-atmospheric pressures. The reaction is run until the desired degree of adhesiveness is obtained or until the condensation reaction is essentially complete. Typically the reaction is run from 1 to 24 hours, however, this will vary depending on the components employed and the reaction temperature. One skilled in the art will be able to readily determine the time needed to achieve the desired degree of adhesiveness or to essentially complete the condensation reaction.

A solvent may be employed to facilitate the mixing of the reactants and/or to dilute the resulting pressure sensitive adhesive. Typical solvents include benzene, toluene, xylene, naptha and mineral spirits. Other solvents may be used so long as they are not reactive with the adhesive or adhesive components. The solvent may be present at any level necessary to provide the desired viscosity of the reactants or resulting pressure sensitive adhesive. Typically the solvent is present from 5 to 90 wt % based on the total composition, preferably from 10 to 70 wt %. For high solids silicone pressure sensitive adhesives it is preferred to have from 5 to 40 wt % solvent.

The resulting pressure sensitive adhesives can be cured using a crosslinking agent. Crosslinking agents suitable for curing the pressure sensitive adhesives are known in the art and include azo compounds and peroxides such as dichlorobenzoyl peroxide and benzoyl peroxide. Typically the peroxide is added to the pressure sensitive adhesive composition at a level of 0.25 to 10 wt % based on the pressure sensitive adhesive solids, preferably from 1 to 5 wt %.

The silicone pressure sensitive adhesives produced by the method of the instant invention may be used in applications for which silicone pressure sensitive adhesives are known in the art. Typically the silicone pressure sensitive adhesives are applied to a substrate such as paper, wood, cloth, glass, silicone resin coated glass cloth, cement, concrete, brick, ceramic, and other siliceous materials; plastics such as polyolefins, polyesters, polyamides, polyacrylates, polyfluoroolefins and polysiloxanes; metals such as aluminum, iron, steel, copper, tin, silver, gold, platinum and their alloys; and others. Generally, the adhesive layer is 0.2 to 5.0 mils or more thick, preferably 0.4 to 3.0 mils thick. The silicone pressure sensitive adhesive composition produced by the method of the instant invention may be applied to the substrate using any method known in the art.

So that those skilled in the art can understand and appreciate the invention taught herein, the following examples are presented, it being understood that these examples should not be used to limit the scope of this invention found in the claims.

MATERIALS USED IN PATENT EXAMPLES

RESIN A: A benzene-soluble, MQ having a M/Q ratio= 0.78/1.0, an OH content of 2.9 wt % per g of resin solid, and the following molecular weight characteristics as determined by GPC in chloroform, using fractionated MQ resin standards and an IR detector: $M_n=4,300$, $M_w=14,600$, $M_w/M_n=3.395$.

RESIN B: A benzene-soluble, MQ having a M/Q ratio= 0.73, an OH content of 3.02 wt % per g of resin solid, and the following molecular weight characteristics as determined by GPC in chloroform, using fractionated MQ resin standards and an IR detector: $M_n=5284$, $M_w=29,990$, $M_w/M_n=5.68$.

RESIN C: A benzene-soluble, MQ having a M/Q ratio= 0.71, an OH content of 2.8 wt % per g of resin solid, and the following molecular weight characteristics as determined by GPC in Chloroform, using fractionated MQ resin standards and an IR detector: $M_n=5304$, $M_w=26290$, $M_w/M_n=4.96$.

RESIN D: A benzene-soluble, MQ having a M/Q ratio= 0.73, an OH content of 3.0 wt % per g of resin solid, and the following molecular weight characteristics as determined by GPC in Chloroform, using fractionated MQ resin standards and an IR detector: $M_n=4645$, $M_w=17,810$, $M_w/M_n=3.83$.

POLYMER A: OH-endblocked polydimethylsiloxane fluid having a viscosity of 330,000 mPa's, $M_n=90,310$, and $M_w=174,700$. Molecular weight properties were determined by GPC in toluene solvent, and using polydimethylsiloxane standards.

POLYMER B: OH-endblocked polydimethylsiloxane fluid having a viscosity of 150,000 mPa's, $M_n=73,820$, and $M_w=138,600$. Molecular weight properties were determined by GPC in toluene solvent, and using polydimethylsiloxane standards.

POLYMER C: OH-endblocked polydimethylsiloxane fluid having a viscosity of approx. 55,000 mPa's, $M_n=52,910$, and $M_w=101,200$. Molecular weight properties were determined by GPC in toluene solvent, and using polydimethylsiloxane standards.

POLYMER D: OH-endblocked polydimethylsiloxane fluid having a viscosity of approx. 15,000 mPa's, $M_n=38,200$, and $M_w=68,470$. Molecular weight properties were determined by GPC in toluene solvent, and using polydimethylsiloxane standards.

POLYMER E: OH-endblocked polydimethylsiloxane fluid having a viscosity of approx. 2,000 mPa's, $M_n=21,490$, and $M_w=37,950$. Molecular weight properties were determined by GPC in toluene solvent, and using polydimethylsiloxane standards.

POLYMER F: OH-endblocked diorganopolysiloxane gum containing 2 mole % MeViSiO having a plasticity=59 mils, NVC=92.

POLYMER G: OH-endblocked diorganopolysiloxane gum having a plasticity approx. 60 mils, NVC approx. 97%.

POLYMER H: OH-endblocked dioroganopolysiloxane gum having a plasticity approx. 57 mils.

THERMAL STABILITY ADDITIVE: Rare Earth metal complex of a fatty acid; 6% active metals in an aliphatic hydrocarbon.

PEROXIDES: Perkadox(R) PD-50S-ps-a: 50 wt % 2,4-dichlorobenzoyl peroxide, in a proprietary polysiloxane fluid supplied by Nobel Chemicals Inc.

Benzoyl Peroxide granules; 98% purity; supplied by Aldrich Company.

TEST METHODS

Adhesion was measured by applying a 6×1 inch strip of Kapton™ or Mylar™ backed adhesive to a clean 2×6 inch (5.1×15.2 cm) stainless steel panel using two passes of a 2 Kg rubber coated roller. The force to remove the tape from the panel was measured with a Keil Tester at a peel angle of 180° at a rate of 12 inches (30.48 cm) per minute. The values recorded are the average of multiple readings taken during the course of one pull per sample. The readings are reported in units of g/cm.

Tack was measured on five one-inch (2.54 cm) squares of the Kapton™ or Mylar™ backed adhesive using a POLYKEN® probe tack tester, available from Testing Machines, Inc. Amityville, N.Y. The tack tester has a 0.5 cm diameter probe. The test procedure used a 0–20 grams weight, a dwell time of 0.5 seconds and a pull speed of 0.5 cm per second. The results reported represent the average of five readings, expressed in g.

Non-volatile content (percent solids) was determined by weighing 2 g of the pressure sensitive adhesive into aluminum dish, and in 150° C. oven for 1 hr and expressing the weight of the residue as a percentage of the original sample weight.

MQ Resin non-volatile content was determined by combining 1.5 g of the MQ Resin solution with 0.75 g of 100 mm²/s polydimethylsiloxane fluid, followed by heating at 150° C. for 2 hrs.

Molecular weights of the MQ resin and polymers were measured by gel-permeation chromatography (GPC) using a Varian TSK 4000+2500 columns at 35° C., a toluene mobile phase at 1 mL/min. Polydimethylsiloxane standards were used for linear regression calibrations. A refractive index detector was used in the GPC measurements.

$Si^{29}$ NMR was used to determine M/Q ratios and OH content in MQ resin.

Viscosity was measured in centipoise at room temperature (25° C.±2) using a Brookfield rotating disc viscometer fitted with an LV-4 spindle.

Cohesive strength (Pan Tear Test) was measured by placing enough of the pressure sensitive adhesive into a clean aluminum dish to produce a 0.5 to 2.0 mm thick film. The cup was then placed in a forced draft oven at 150° C. for one (1) hour. The cup was then removed from the oven and allowed to cool to room temperature. The cup was then torn in half by hand and pulled apart. If the dry film stretches across the tear with a rubber-like elongation the adhesive passed. If the film tears along with the cup and exhibits very little elongation, the adhesive failed.

Stress was measured by ASTM Method D-412 using an Instron Model No. 1122 equipped with a 50 lb. (27.2 Kg) load cell, set at 0.5 full scale load and pulled 10 inches (25.4 cm) per minute. Solvent free films of approximately 10 mils thickness were prepared on Take-off® Industrial (2 mil) release liner in an air circulating oven, the solvent free films being covered with the same release liner to permit cutting with a ¼ inch tensile bar die. The tensile bars were measured to the nearest 0.001 inch (0.0025 cm) with a micrometer. The films were submersed in liquid nitrogen to facilitate the removal of the release liner, harnessed into the Instron jaws set at 1 inch (2.54 cm) clearance and pull per the previously mentioned conditions.

COMPARATIVE EXAMPLE 1

148.8 g of Resin A, 74.2 g of polymer A, 77.0 g of toluene, and 0.06 g of the Thermal Stability Additive were combined and thoroughly blended. The mixture was maintained at reflux for approximately 2 hrs. The water generated was continuously removed during the reflux. The product was stripped at atmospheric pressure to a non-volatiles content of approximately 75% solids. The viscosity of the PSA was approximately 4,000 mPa's at 75% solids.

This PSA was subjected to, and failed, the "Pan Tear Test" which is indicative of the weak cohesive strength of the pressure sensitive adhesive.

COMPARATIVE EXAMPLE 2

148.8 g of Resin A, 74.2 g of polymer A, 77.0 g of toluene, and 0.06 g of the Thermal Stability Additive were combined and thoroughly blended. The blend was stripped at atmospheric pressure to a non-volatiles content of approximately 75% solids. The viscosity of the PSA was approximately 4,600 mPa's at 75% solids.

This PSA was subjected to, and failed, the "Pan Tear Test" which is indicative of the weak cohesive strength of the pressure sensitive adhesive.

COMPARATIVE EXAMPLE 3

128.9 g of Resin C and 86.2 g of xylene were combined and thoroughly mixed. To this was added 84.9 g of Polymer H which contained 22.5 ppm of potassium. The reactants were heated to approximately 140° C. and held at that temperature for approximately 5 hours. The water generated was continuously removed. The reaction was run two more times. The results are reported in Table 1. The viscosity is reported at 56.5% solids.

TABLE 1

Results of Comparative Example 3

| Run No. | Visc. (mPa · s) | Stress (kPa) | Adhesion (g/cm) | Tack (g/cm²) |
|---|---|---|---|---|
| 1 | 123,152 | 206.8 | 216.7 | 851 |
| 2 | 59,699 | 468.8 | 203.3 | 578 |
| 3 | 92,516 | 524.0 | 227.9 | 665 |

EXAMPLE 1

325.3 g of xylene and 325.3 g of toluene were place in a flask. To this was added 0.65 g of acetic acid, 433.4 g of Polymer H, 716.7 g of Resin D and an additional 5.4 g of acetic acid. The mixture was agitated for 30 minutes and heated at 130° C. for 5 hours. The water generated was continuously removed during the reflux step. The silicone pressure sensitive adhesive had a viscosity of 73,580 mPa's at 56.5% NVC, a stress of 503.3 kPa, a tack of 458 g/cm² and an adhesion of 274.8 g/cm.

EXAMPLE 2

335.4 g of xylene and 335.4 g of toluene were place into a flask. To this was added 0.69 g of acetic acid, 463.3 g of Polymer H, 666 g of Resin C and an additional 1.8 g of acetic acid. The mixture was agitated for 30 minutes and heated at 130° C. for 2 hours. The water generated was continuously removed during the reflux step. The silicone pressure sensitive adhesive had a viscosity of 114,284 mPa's at 56.5% NVC, a stress of 452.3 kPa, a tack of 915 g/cm$^2$ and an adhesion of 384.2 g/cm.

EXAMPLE 3

196.4 g of toluene and 458.2 g of xylene were place into a flask. To this was added 0.67 g of acetic acid, 448.4 g of Polymer H, 697.1 g of Resin D and an additional 3.6 g of acetic acid. The mixture was agitated for 30 minutes and heated at 135° for 3.5 hours. The water generated was continuously removed during the reflux step. The silicone pressure sensitive adhesive had a viscosity of 89,223.0 mPa's at 56.5% NVC, a stress of 355.1 kPa, a tack of 986 g/cm$^2$ and an adhesion of 370.8 g/cm.

EXAMPLE 4

Using the same procedure as in Example 3, nine (9) silicone pressure sensitive adhesives were prepared having a resin to polymer ratio of 54%, using 50 ppm acetic acid. The results of the 9 runs is in Table 2. Viscosity is reported for 56.5% NVC.

TABLE 2

Results of Example 4

| Run No. | Visc (mPa · s) | Stress (kPa) | Adhesion (g/cm) | Tack (g/cm$^2$) |
|---|---|---|---|---|
| 1 | 86890 | 158.5 | 254.7 | 665 |
| 2 | 91825 | 177.2 | 323.9 | 592 |
| 3 | 88463 | 184.1 | 227.9 | 662 |
| 4 | 98645 | 191.0 | 212.2 | 677 |
| 5 | 95505 | 173.7 | 237.4 | 674 |
| 6 | 90484 | 186.8 | 245.7 | 649 |
| 7 | 92171 | 181.3 | 259.1 | 688 |
| 8 | 91119 | 154.4 | 243.5 | 690 |
| 9 | 86527 | 177.9 | 227.9 | 697 |
| Average | 91292 | 175.8 | 248.1 | 666 |
| Std. Dev | 3931 | 12.3 | 31.9 | 31.6 |

EXAMPLE 5

Approximately 146.3 g of Resin A, 76.4 g of polymer B, 77.4 g of toluene, 0.06 g of the Thermal Stability Additive, and 0.68 g glacial acetic acid, were combined and thoroughly blended. The mixture was heated at reflux for approximately 4 hrs. The water generated, was continuously removed during the reflux step. The product was stripped at atmospheric pressure to a non-volatiles content of ~90% solids. The viscosity of the PSA was ~234,000 mPa's at 89.7% solids.

The PSA was subjected to, and passed, the "Pan Tear Test" which is indicative of the good cohesive strength of the pressure sensitive adhesive.

EXAMPLE 6

Approximately 146.3 g of Resin A, 76.8 g of polymer C, 77.0 g of toluene, 0.06 g of the Thermal Stability Additive, and 0.68 g glacial acetic acid, were combined and thoroughly blended. The mixture was heated at reflux for approximately 4 hrs. Water was continuously removed during the reflux step. The product was stripped at atmospheric pressure to a non-volatiles content of ~90% solids. The high solids product was then recovered and stored for later use. The viscosity of the product was ~264,000 mPa's at 90.8% solids.

EXAMPLE 7

Approximately 146.3 g of Resin A, 76.4 g of polymer D, 77.4 g of toluene, 0.06 g of the Thermal Stability Additive, and 0.68 g glacial acetic acid, were combined and thoroughly blended. The mixture was heated at reflux for approximately 4 hrs. Water was continuously removed during the reflux step. The product was stripped at atmospheric pressure to a non-volatiles content of ~90% solids. The product had a viscosity of 98,000 mPa's at 90% solids.

EXAMPLE 8

Approximately 150.1 g of Resin A, 73.6 g of polymer E, 76.3 g of toluene, 0.06 g of the Thermal Stability Additive, and 2.7 g glacial acetic acid, were combined and thoroughly blended. The mixture was heated at reflux for approximately 5 hrs. Water was continuously removed during the reflux step. The product was stripped at atmospheric pressure to a non-volatiles content of ~90% solids. The viscosity of the PSA was 93,500 mPa's at 90.5% solids.

EXAMPLE 9

Approximately 150.1 g of Resin A, 73.6 g of polymer D, 76.3 g of toluene, 0.06 g of the Thermal Stability Additive, and 2.7 g glacial acetic acid, were combined and thoroughly blended. The mixture was heated at reflux for approximately 4 hrs. Water was continuously removed during the reflux step. The product was stripped at atmospheric pressure to a non-volatiles content of ~85.5% solids. The viscosity of the PSA was 19,750 mPa's at 85.5% solids.

EXAMPLE 10

Approximately 133.7 g of Resin A, 85.9 g of polymer C, 80.4 g of toluene, 0.06 g of the Thermal Stability Additive, and 2.7 g glacial acetic acid, were combined and thoroughly blended. The mixture was heated at reflux for approximately 4 hrs. Water was continuously removed during the reflux step. The product was stripped at atmospheric pressure to a non-volatiles content of ~85% solids. The viscosity of the PSA was 62,000 mPa's at 85.2% solids.

EXAMPLE 11

Approximately 174.0 g of Resin A, 56.6 g of polymer C, 69.3 g of toluene, 0.06 g of the Thermal Stability Additive, and 2.7 g glacial acetic acid, were combined and thoroughly blended. The mixture was heated at reflux for approximately 4 hrs. Water was continuously removed during the reflux step. The product was stripped at atmospheric pressure to a non-volatiles content of ~85% solids. The viscosity of the PSA was 20,000 mPa's at 86.1% solids.

EXAMPLE 12

Approximately 146.3 g of Resin A, 70.3 g of polymer D, 6.6 g polymer F, 77.4 g of toluene, 0.06 g of the Thermal Stability Additive, and 2.7 g glacial acetic acid, were combined and thoroughly blended. The mixture was heated at reflux for approximately 5 hrs. Water was continuously removed during the reflux step. The product was stripped at atmospheric pressure to a non-volatiles content of ~85% solids. The viscosity of the PSA was 33,500 mPa's at 84.4% solids.

EXAMPLE 13

Portions of the PSA samples described in examples 5, 6, 7, and 12, were mixed with benzoyl peroxide at a 2 wt % level of peroxide based on PSA solids. The peroxide was incorporated into the PSA as a 10% solution in toluene. The adhesive was then cast onto 1 mil Kapton® film at a thickness sufficient to yield a 2 mil cured PSA film. The cast PSA films were devolatilized for 2 minutes at 70 °C., and then cured for 2 minutes at 204° C. The sheets supporting the PSA coatings were then cut into 1" (2.54 cm) wide strips and tested for 180 Peel Adhesion and Polyken® Probe Tack. Results are provided below.

| PSA SAMPLE | 180 PEEL ADHESION | PROBE TACK |
| --- | --- | --- |
| 5 | 357.4 g/cm | 853 g/cm$^2$ |
| 6 | 323.9 g/cm | 795 g/cm$^2$ |
| 7 | 335.1 g/cm | 830 g/cm$^2$ |
| 12 | 312.8 g/cm | 868 g/cm$^2$ |

EXAMPLE 14

A PSA blend was prepared by combining 3 parts by weight of the product described in Example 10, per 1 part of the product described in Example 11, and mixing until a uniform dispersion was obtained. The mixture was then mixed with the peroxide as described in Example 13, and cast onto 2 mil Polyester film (Mylar A) at a thickness sufficient to yield a 1.5 mil, cured PSA film. The cast PSA film was devolatilized for 2 minutes at 70° C., and then cured for 2 minutes at 178° C. The sheet supporting the PSA coatings was then cut into 1" (2.54 cm) wide strips and tested for 180 Peel Adhesion.
PEEL ADHESION: 536.2 g/cm
PROBE TACK: 1,052 g/cm$^2$

EXAMPLE 15

A portion of the PSA sample described in Example 9 was mixed with Perkadox® PD-50-ps-a at a 2 wt % level of peroxide based on PSA solids. The adhesive solution was then cast onto 1 mil Kapton® film at a thickness sufficient to yield a 2 mil cured PSA film. The cast PSA film was devolatilized for 2 minutes at 70° C., and then for 2 minutes at 204° C. The sheet supporting the PSA coatings was then cut into 1" (2.54 cm) wide strips and tested for 180 Peel Adhesion and Polyken® Probe Tack. Results are provided below.
PEEL ADHESION: 290.4 g/cm
PROBE TACK: 789 g/cm$^2$

EXAMPLE 16

A portion of the PSA sample described in Example 8 mixed with peroxide as described in Example 15, was also cast onto 2 mil Polyester film (Mylar A) at a "wet film" thickness sufficient to yield a 2 mil cured PSA film. The cast PSA film was devolatilized for 2 minutes at 70° C., and then cured for 2 minutes at 178° C. The sheet supporting the PSA coating was then cut into 1" (2.54 cm) wide strips and tested for 180 Peel Adhesion and Polyken® Probe Tack. Results are provided below.
PEEL ADHESION: 491.5 g/cm
PROBE TACK: 896 g/cm$^2$

EXAMPLE 17

Portions of the PSA samples described in Comparative Examples 1 and 2, and Example 5, were mixed with peroxide as described in Example 13, and cast onto 2 mil Polyester film (Mylar A) at a thickness sufficient to yield a 2 mil cured PSA film. The cast PSA film was devolatilized for 2 minutes at 70° C., and then cured for 2 minutes at 178° C. The sheet supporting the PSA coatings was then cut into 1" (2.54 cm) wide strips and tested for 180 Peel Adhesion. Both sample films failed cohesively on the stainless steel panel.

EXAMPLE 18

Approximately 1,463 g Resin A, 768 g Polymer G, 777 g toluene, and 0.6 g of the Thermal Stability Additive, were combined and blended together until a uniform mixture was obtained. Four adhesives were prepared, using the same procedures as described in the previous examples. Each adhesive was formulated and processed using 300 g of the masterbatch described above. To each 300 g aliquot of the adhesive mixture was added 2.7 g glacial acetic acid. Each sample was then heated to reflux and maintained at this temperature (125° C. approx.) for varied time periods. Each mixture was stripped to approximately 85% solids. Viscosity measurements were then taken at room temperature for each PSA, and documented as a function of time at reflux.

| PSA SAMPLE | TIME @ REFLUX | BROOKFIELD VISCOSITY | NON-VOLATILE CONTENT |
| --- | --- | --- | --- |
| 18a | 1 hr. | 31,250 mPa · s | 84.3% |
| 18b | 2 hr. | 38,250 mPa · s | 85.3% |
| 18c | 4 hr. | 41,750 mPa · s | 85.6% |
| 18d | 14 hr. | 52,000 mPa · s | 86.2% |

EXAMPLE 19

Approximately 183 g of Resin B, 100 g of polymer G, 176 g of xylene and 15 ppm based on the total solution of potassium as potassium acetate were combined and thoroughly blended. The mixture was heated at reflux for approximately 2 hrs. Water was continuously removed during the reflux step. The product was stripped at atmospheric pressure to a non-volatiles content in the range of 56.5% solids. The viscosity of the PSA was 40,700 mPa's at 56.5% solids. The stress was 365.4 kPa.

The same experiment was repeated a second time. The viscosity of the PSA was 38,030 mPa'$^{-5}$ at 56.5% solids. The stress was 234.4 kPa.

What is claimed is:

1. A method of producing silicone pressure sensitive adhesives wherein the method comprises (I) combining together
  (A) a benzene soluble, hydroxyl containing organopolysiloxane resin consisting essentially of $R_3SiO_{1/2}$ siloxane units and $SiO_{4/2}$ siloxane units, wherein R is a monovalent radical selected from the group consisting of hydrocarbon and halogenated hydrocarbon radicals having from 1 to 10 carbon atoms; there being from 0.5 to 1.5 $R_3SiO_{1/2}$ units for every $SiO_{4/2}$ units and there being 1.0 to 5 wt % hydroxyl functionality based on $Si^{29}$ NMR and
  (B) a hydroxyl containing polydiorganosiloxane having a viscosity of $\geq 100$ mPa's and thereafter; and
  (C) a catalyst selected from the group consisting of carboxylic acids and metal Salts of carboxylic acids wherein the metal is selected from the group consisting of Li, Na, K, Ce and Ca; and (II) heating the mixture of (A), (B) and (C) for a time sufficient to produce the silicone pressure sensitive adhesive.

2. A method as claimed in claim 1 wherein the hydroxyl containing polydiorganosiloxane has a viscosity of between 100 mPa's and 1,000,000 mPa's.

3. A method as claimed in claim 1 wherein the hydroxyl containing polydiorganosiloxane has a viscosity of $\geq 1,000,000$ mPa's.

4. A method as claimed in claim 1 wherein the hydroxyl containing polydiorganosiloxane is a hydroxyl-endblocked polydimethylsiloxane.

5. A method as claimed in claim 1 wherein the catalyst is acetic acid.

6. A method as claimed in claim 1 wherein the catalyst is potassium acetate.

7. A method as claimed in claim 1 wherein the catalyst is propionic acid.

8. A method as claimed in claim 1 wherein there is between 5 and 10,000 ppm catalyst based on the combined weight of (A) and (B).

9. A method as claimed in claim 1 wherein there is between 5 and 500 ppm catalyst based on the combined weight of (A) and (B).

10. A method as claimed in claim 1 wherein the resin (A) consists essentially of $(CH_3)_3SiO_{1/2}$ siloxane units and $SiO_{4/2}$ siloxane units there being from 0.6 to 1.1 $R_3SiO_{1/2}$ units for every $SiO_{4/2}$ unit and there being 1.8 to 3.6 wt % hydroxyl functionality based on $Si^{29}$ NMR.

11. A method as claimed in claim 1 wherein the method further comprises further curing the silicone pressure sensitive adhesive with a crossliking agent selected from the group consisting of azo compounds and peroxide compounds.

* * * * *